(12) United States Patent
Higgins (10) Patent No.: US 10,031,837 B1
(45) Date of Patent: *Jul. 24, 2018

(54) DYNAMIC SERVICE DEBUGGING IN A VIRTUAL ENVIRONMENT

(71) Applicant: Amazon Technologies, Inc., Seattle, WA (US)

(72) Inventor: Chris Higgins, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,970

(22) Filed: Feb. 15, 2016

Related U.S. Application Data (63) Continuation of application No. 14/226,328, filed on Mar. 26, 2014, now Pat. No. 9,270,553.

(51) Int. Cl.
  *G06F 15/16* (2006.01)
  *G06F 11/36* (2006.01)

(52) U.S. Cl.
  CPC ...... *G06F 11/3664* (2013.01); *G06F 11/3636* (2013.01)

(58) Field of Classification Search
  CPC .......................... G06F 11/3664; G06F 11/3636
  USPC ....... 709/201, 219, 221, 223, 246, 203, 217, 709/225, 232
  See application file for complete search history.

(56) References Cited

U.S. PATENT DOCUMENTS

| 5,892,941 | A | * | 4/1999 | Khan | G06F 11/3664 703/22 |
| --- | --- | --- | --- | --- | --- |
| 6,324,683 | B1 | * | 11/2001 | Fuh | G06F 11/362 714/E11.21 |
| 6,446,221 | B1 | | 9/2002 | Jaggar et al. | |
| 6,892,324 | B1 | | 5/2005 | French et al. | |
| 6,934,937 | B1 | | 8/2005 | Johnson et al. | |
| 6,993,585 | B1 | | 1/2006 | Starkovich et al. | |
| 7,107,578 | B1 | * | 9/2006 | Alpern | G06F 11/3636 714/E11.207 |
| 7,302,676 | B2 | * | 11/2007 | Schmitt | G05B 19/056 714/38.1 |
| 7,992,133 | B1 | | 8/2011 | Theroux et al. | |
| 8,135,572 | B2 | | 3/2012 | Crawford et al. | |
| 8,689,186 | B2 | | 4/2014 | Savur et al. | |
| 2002/0062359 | A1 | * | 5/2002 | Klopp | H04L 12/2602 709/219 |
| 2003/0233634 | A1 | | 12/2003 | Carrez et al. | |
| 2004/0148548 | A1 | | 7/2004 | Moyer et al. | |

(Continued)

*Primary Examiner* — Michael Y Won
(74) *Attorney, Agent, or Firm* — Klarquist Sparkman, LLP (57) ABSTRACT

A service oriented architecture (SOA) provides on-demand service call debugging and call stack tracing. The service call (e.g., an API) includes a new field and optional signature value. The field is a 'debug-requested' field, and the optional field is a unique call-id signature. The service provider can enable debugging in accordance with the debug-requested field for this service call, and tag all debugged data with the unique call-id. If it is necessary to call other services to fulfill the request, then the service can pass the 'debug-requested' field and the 'unique id' in the call to that service. Using this mechanism, detailed debugging can be supported across an entire stack for only those requests that need it and the performance/latency impact of having debugging enabled only applies to the subset of calls which need debugging.

17 Claims, 9 Drawing Sheets

(56) References Cited

U.S. PATENT DOCUMENTS

| | | | |
|---|---|---|---|
| 2005/0071243 A1* | 3/2005 | Somasekaran | G06Q 30/0601 |
| | | | 705/26.1 |
| 2007/0240125 A1* | 10/2007 | Degenhardt | G06F 11/3632 |
| | | | 717/129 |
| 2007/0244904 A1 | 10/2007 | Durski | |
| 2009/0135731 A1 | 5/2009 | Secades et al. | |
| 2011/0131295 A1* | 6/2011 | Jolfaei | G06F 11/366 |
| | | | 709/219 |

* cited by examiner

DYNAMIC SERVICE DEBUGGING IN A VIRTUAL ENVIRONMENT

BACKGROUND

This is a continuation of U.S. application Ser. No. 14/226,328, filed Mar. 26, 2014, which application is incorporated herein in its entirety.

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing can be formed by a plurality of services. The details of how services operate is often hidden from external customers that interface with the services through Application Program Interfaces (APIs). Trouble shooting errors can be problematic when multiple services are involved in generating a response to an API call. For example, it can be difficult to determine which service caused an error when hundreds of services are involved in the response.

As a result, many of the services activate full-debug capability on an ongoing basis. Unfortunately, this slows each service, which can have a cumulative effect when many services are used in generating a single response to an API request.

DETAILED DESCRIPTION

A service-oriented architecture (SOA) provides on-demand service call debugging and call-stack tracing. The service call (e.g., an API) includes a new field and optional signature value. The field is a 'debug-requested' field, and the optional field is a unique call-id signature. The debug-requested field and optional signature value can be API independent meaning that it can be used with any API to assist with modifying a debug mode in the service provider as it processing the API. Upon receipt of the service call, the service provider checks to see if there is a unique call-id signature along with the 'debug-requested' field. If there is no unique call-id, then one can be dynamically generated. The service provider can enable debugging in accordance with the debug-requested field for this service call, and tag all debugged data with the unique call-id. If it is necessary to call other services to fulfill the request, then the service can pass the 'debug-requested' field and the 'unique id' in the call to the other services. If every service in the call stack supports this mechanism, then detailed debugging can be supported across the entire stack for just those requests that need it and the performance/latency impact of having debugging enabled only applies to the subset of calls which need debugging. One advantage of accepting the 'debug-requested' flag at any entry point into the call tree is that it allows services to enable debugging for a single service call only. Other service calls that do not need debugging can leave debugging switched off. Alternatively, the debug-requested field can provide a level of debugging, such as errors only, a stack trace, or a complete log. Thus, the debug-requested field allows the caller to dynamically control a debug mode within the service provider.

The services used in cloud computing are typically Web services. A web service is a software function provided at a network address over the web or the cloud. Clients initiate web service requests to servers and servers process the requests and return appropriate responses. The client web service requests are typically initiated using, for example, an API request. For purposes of simplicity, web service requests are generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 1:
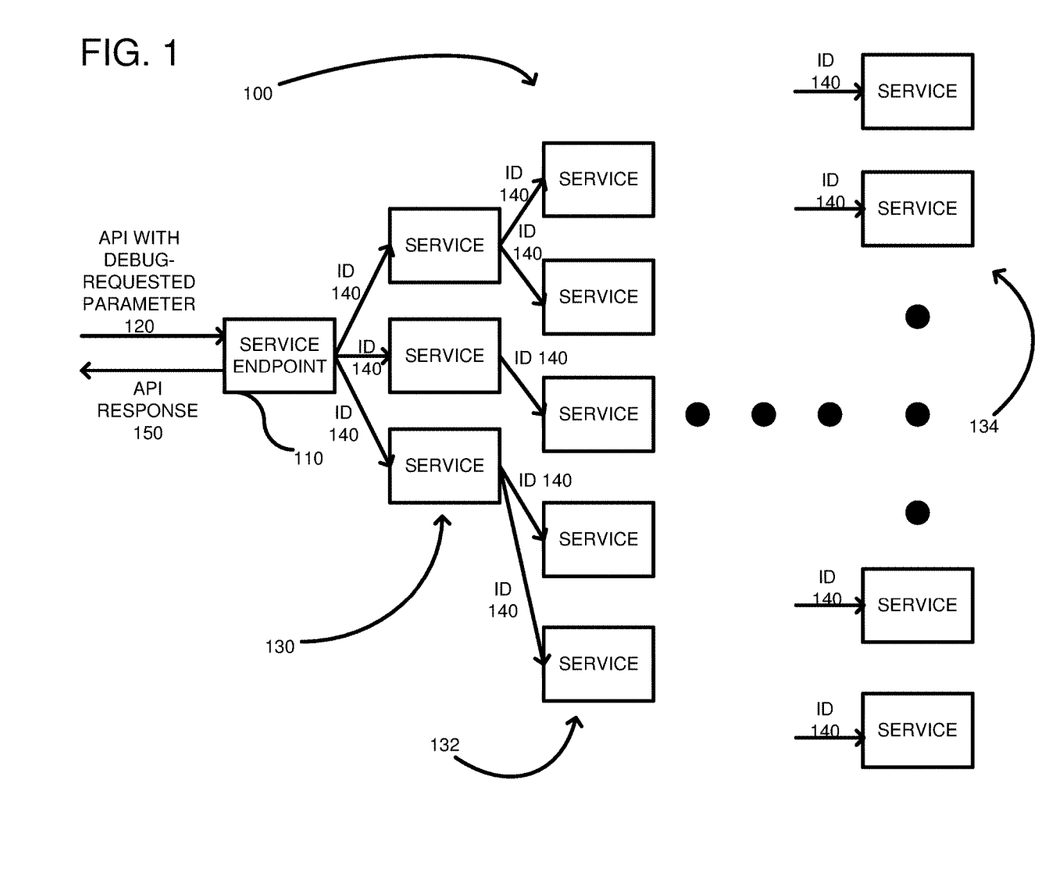
FIG. 1 is an overall system diagram showing a plurality of services used in responding to an API request, wherein the API request includes a debug-requested parameter.

FIG. 1 shows a service provider 100 as including a plurality of services. Generally, the services can make requests to other services and receive corresponding responses. For example, each service can be a Web service and make an API request to other services. The service provider 100 can include one or more endpoints, such as service endpoint 110. A request for a service is shown at 120 and can include a debug-requested parameter. When the endpoint 110 receives the API request 120, it can be a starting point of a calling chain of services used in the service provider 100 in responding to the request. For example, in response to the request 120, the endpoint 110 can generate its own API requests to a first level of services shown generally at 130. Those services can, in turn, call a second level of services shown at 132, and so on, until an Nth level (where N is any integer value) of services 134 are called. The service endpoint 110 can pass to the services 130 a unique debug identifier, such as shown at 140. The services 130 can then pass the identifier to the downstream services 132, and so on. The identifier 140 can be used by the services as a key in storing debug data (e.g., metadata and log data, such as errors, times, parameter, etc.) so that log data is stored across services using the same key associated with the API request. The unique debug identifier 140 can be generated by the service endpoint 110 or received with the AIP request 120. The identifier 140 identifies the request throughout the service calling chain so that all requests can be easily logged and retrieved. The debug-requested parameter can likewise be passed to each of the services 130, 132, etc., so as to establish a consistent debugging behavior across services. Still further, a different parameter associated with the debug-requested parameter can be passed to each of the services. The parameters that are passed are called herein a "debugging mode" and can include the debug-requested parameter, the identifier 140, a combination of the two, and/or some other parameter(s) indicating the debugging mode. When each service receives the debugging mode, it can correspondingly adjust its' level of debugging to be consistent with the debugging mode. Not all services need to behave identically. That is, each service can interpret the debugging mode according to the functionality of the particular service. Additionally, the debugging mode can include a graduated level of debugging and/or a generic on/off flag. Thus, in some cases where there is sensitivity to confidential information, debugging can be selected as off so as to achieve maximum speed in the response while assuring that log data is not maintained or is otherwise minimized.

After the API request has been completed, an API response 150 can be returned to the original requester. If the service endpoint 110 generated the identifier 140, then the API response can include the identifier so that future queries into log data can be made using the identifier. Alternatively, the API response 150 can be returned asynchronously. For example, a response can be returned indicating the request 120 is being processed. The identifier can be included with the asynchronous response. A follow-up second response can be returned when the request is completed or the requestor may need to send a subsequent request for status.

Figure 2:
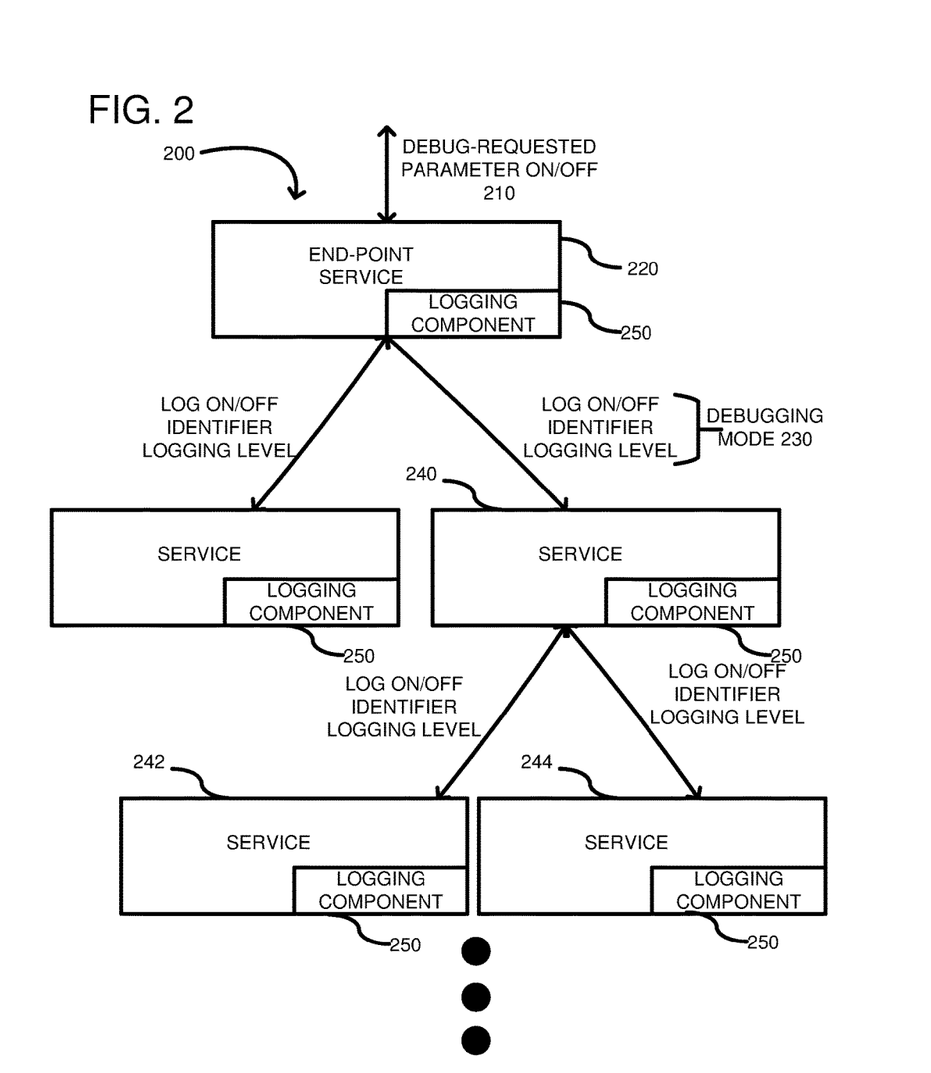
FIG. 2 shows further details of the services of FIG. 1, including logging components used for storing debugging log data.

FIG. 2 shows further details of an example calling chain 200 used in response to receiving an API request including a debug-requested parameter 210. An end-point service 220 can receive the debug-requested parameter 210 and can generate a debugging mode 230 in response thereto. The debugging mode can then be passed to the downstream services in the calling chain 200. The debugging mode can include a flag indicating that debugging is on/off, a unique identifier that can be used to store data for this particular request, and/or a logging level indicating a degree to which logging should be performed. The debugging mode can include any or all of these parameters, and others can be used depending on the particular design. In the particular illustrated embodiment, the same debugging mode 230 is passed to all services in the calling chain. For example, a first downstream service 240 is shown receiving the debugging mode 230 from the end-point service 220. In processing its' response, the service 240 makes two API requests to services 242, 244 and passes each one the same debugging mode 230 which it received. As such, a uniform level of debugging can be implemented across all of the services that are in the calling chain. Services that are not in the calling chain need not receive the debugging mode.

Each of the services 200 can include a logging component 250. The logging components 250 can be responsive to the debugging mode 230 to log data and metadata associated with processing the API request. For example, the metadata can include the other services called, time stamp information, start/stop times, while the log data can include arguments, return values, etc. The log data and metadata can be stored using the identifier as a key so that each logging component 250 stores its data using the same identifier, which is associated with the original API request. Thus, a uniform logging system is used across disparate services within the service provider.

Figure 3:
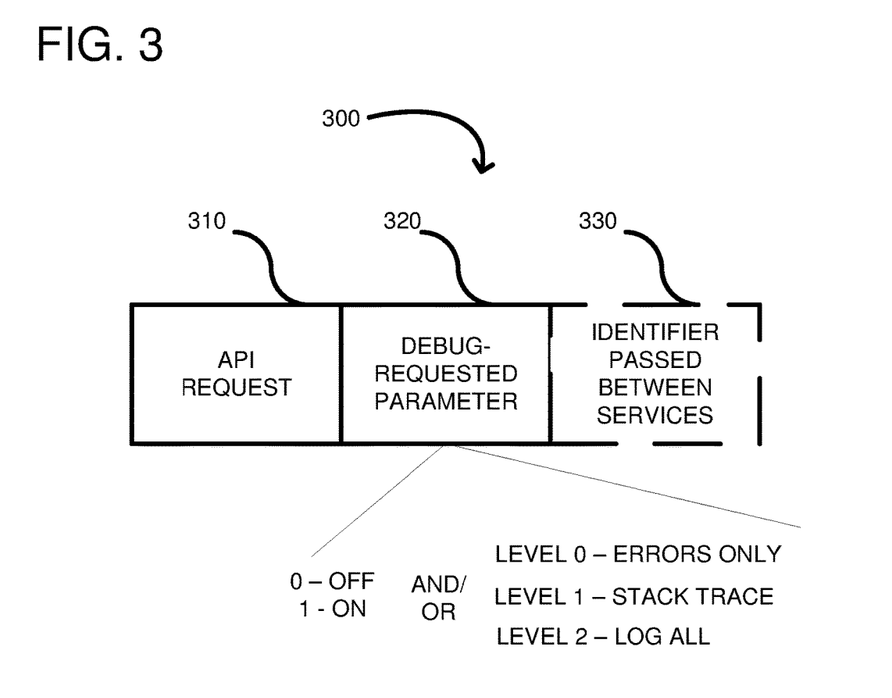
FIG. 3 illustrates an example API request that includes a debug-requested parameter and an identifier to be passed between services.

FIG. 3 shows an example API request 300 including multiple fields, such as the API request itself 310, a debug-requested field 320 and an optional identifier field 330, shown in dashed lines. The API request 310 can be any desired request supported by the service provider. Typical service providers support thousands of requests and the API request 310 can include multiple subfields. The debug-requested parameter 320 can take a variety of forms and can be a simple one-bit flag (ON/OFF) or it can include levels of debugging, such as Level 0 used for errors only, Level 1 used for logging a stack trace, or Level 2 for logging everything. Thus, depending on the level, a more detailed level of logging can be achieved. Still further, the debug-requested parameter 320 can be a combination of the flag and level or other fields can be used. The identifier 330 can be any alpha-numeric combination of characters and should uniquely be associated with the API request. Additional fields related to a debugging mode can be added to the API request.

Figure 4:
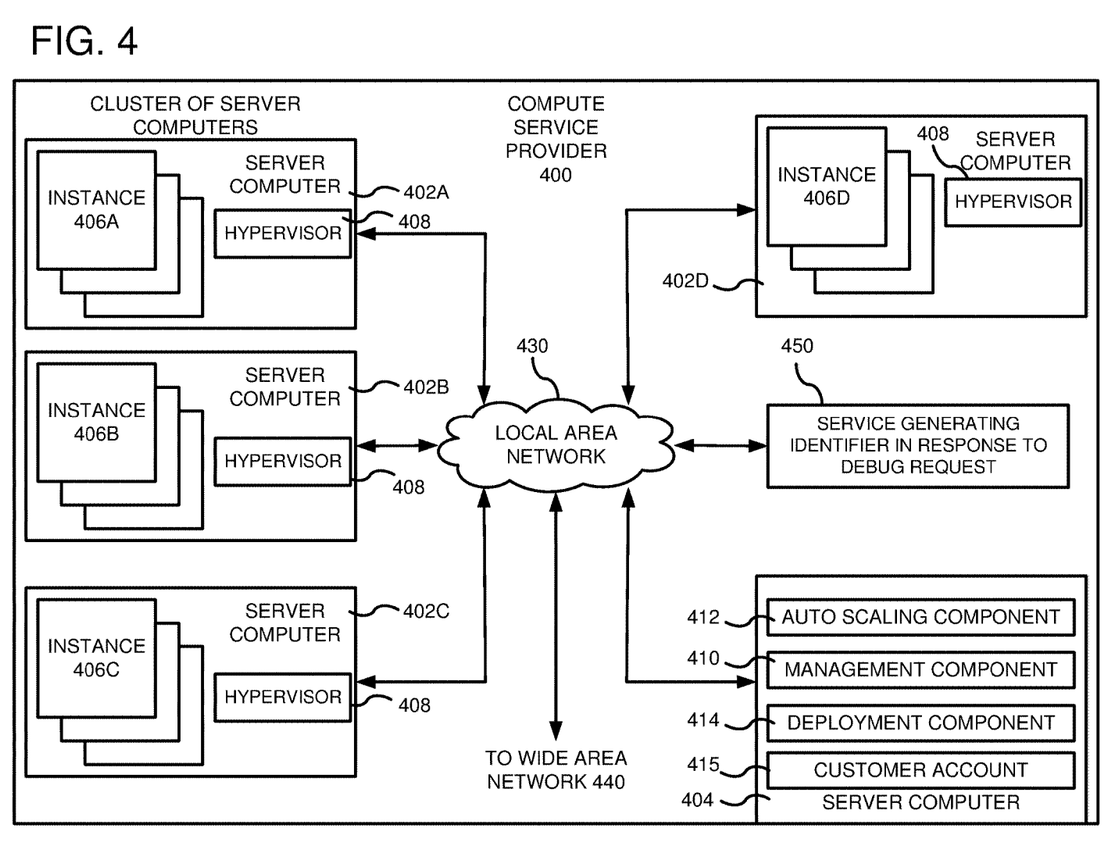
FIG. 4 is an example system diagram showing a plurality of virtual machine instances running in the multi-tenant environment.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. The policy document can include a level of debugging to be used when the debug-requested parameter is activated. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A service 450 can receive an API request and generate an identifier in response to a debug-requested parameter within the API request. Thus, if an identifier is not received with the request, the service 450 can generate an identifier, which can be used as a key for storing log data accumulated through processing the API request. The service 450 can call other services in order to process the request. Once the response is generated, the service 450 can return the response to the caller together with the generated identifier. In this way, the debug-requested parameter can be transformed into an identifier used in storing log data.

Figure 5:
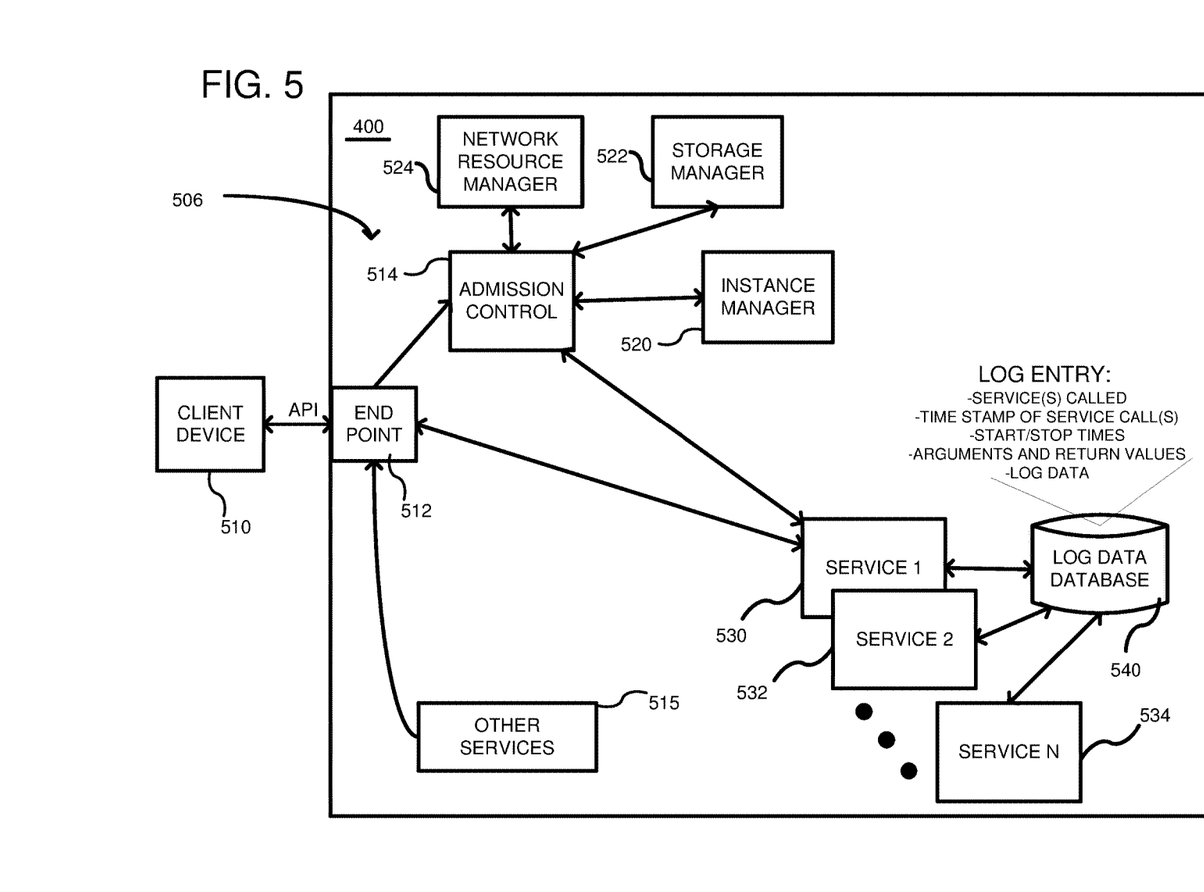
FIG. 5 shows further details of an example system including a plurality of management components associated with a control plane.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 400, can likewise make API requests to the end point 512.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. An instance manager 520 controls launching and termination of instances in the network. When an instruction is received (such as through an API request) to launch an instance, the instance manager pulls resources from a capacity pool and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc.

The endpoint 512 can be coupled to a service 530, which can call other services 532, 534, etc. Any number N (where N is any integer) of services can be called. Assuming that a debug-requested parameter is activated in the API, the services 530, 532, 534 store their respective log data in a log data database 540. Each log service can use the same identifier in order to store the data. An example entry is shown as including other services called, time stamps associated with the calls, start and stop times, arguments and return values, and log data generally. As the log data database 540 is a single repository including the identifier, it can be easy searched for all log data related to the same API call. For example, each API request can have its own unique identifier so that all log data associated with the API request can be retrieved.

Figure 6:
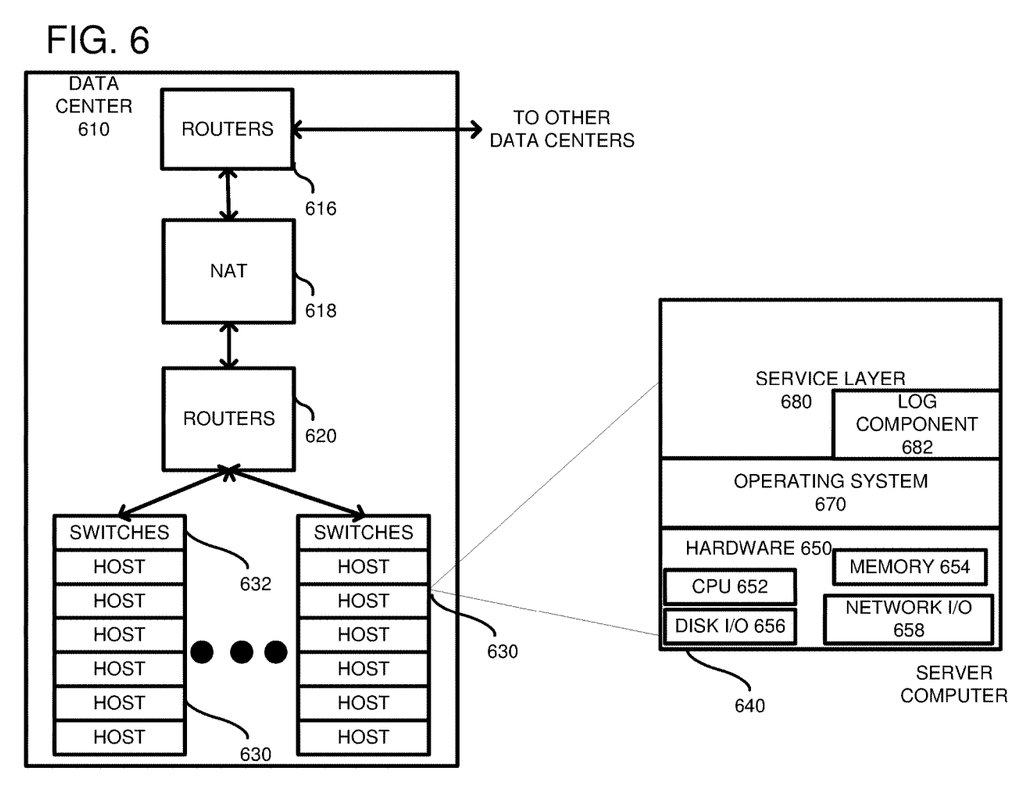
FIG. 6 shows an example of a plurality of host computers, routers and switches, which are hardware assets used for running services.

FIG. 6 illustrates the hardware framework upon which the services can operate. A plurality of data centers, such as data center 610, can be coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs 652, memory 654, disk I/O 656, network I/O 658, etc. Running a layer above the hardware 650 is an operating system 670. The service layer 680 can be an application including a log component 682 used for logging data associated with processing an API request. For example, the log component 682 can obtain access to the hardware 650 through the operating system 670 to record data such as CPU cycles, memory use of memory 654, Disk I/O use from Disk I/O hardware 656 or network I/O use from network I/O hardware 658. The log component 682 can access the log data database 540 using the structure of FIGS. 5 and 6.

Figure 7:
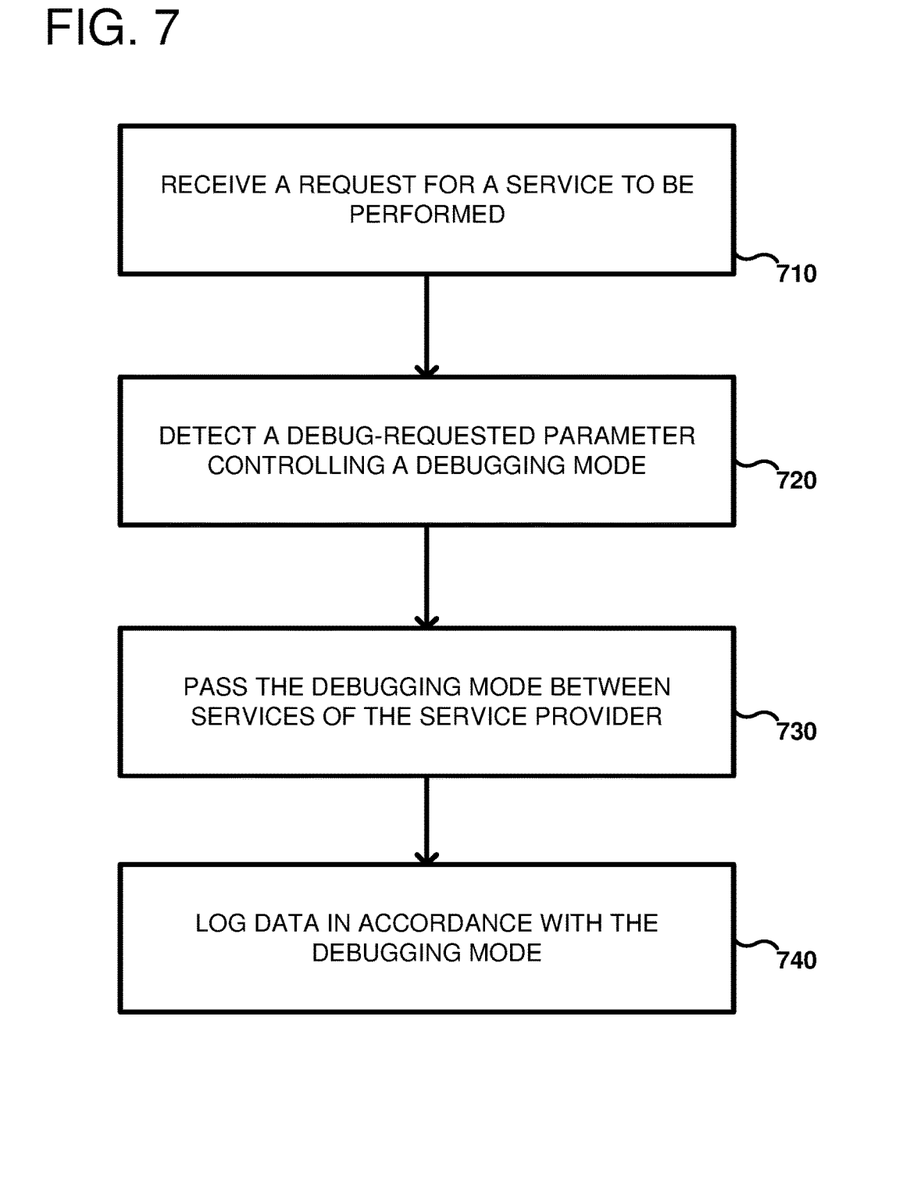
FIG. 7 is a flowchart of a method according to one embodiment used to dynamically control debugging in the multi-tenant environment.

FIG. 7 is a flowchart of an embodiment for dynamically controlling a debugging mode in a service provider. In process block 710, a request is received for a service to be performed. For example, the request can be an API request or other Web service request. In process block 720, a debug-requested parameter can be detected, which controls a debugging mode. The debug-requested parameter can be a field within the request. Thus, a simple parsing of the request can be used to detect the debug-requested parameter. In process block 730, the debugging mode can be passed between services. The debugging mode can be derived directly from the debug-requested parameter or it can be obtained from a policy document linked to a customer account. For example, if the debug-requested parameter is activated, a level of debugging can be obtained from the customer's policy document. Alternatively, all of the debug mode data can be part of the API. In any event, the log data is passed to each service needed in order to generate a response to the API request. In process block 740, data is logged in accordance with the debugging mode. The logging of data can include storing parameters indicating how the service processed the request. Alternatively, parameters can indicate resources (CPU cycles, memory, etc.) used by one or more server computers in processing the request. The logging of data can be performed by those services that receive the debugging mode. It should be recognized that the process blocks can be performed in any desired order and are not necessarily sequential.

Figure 8:
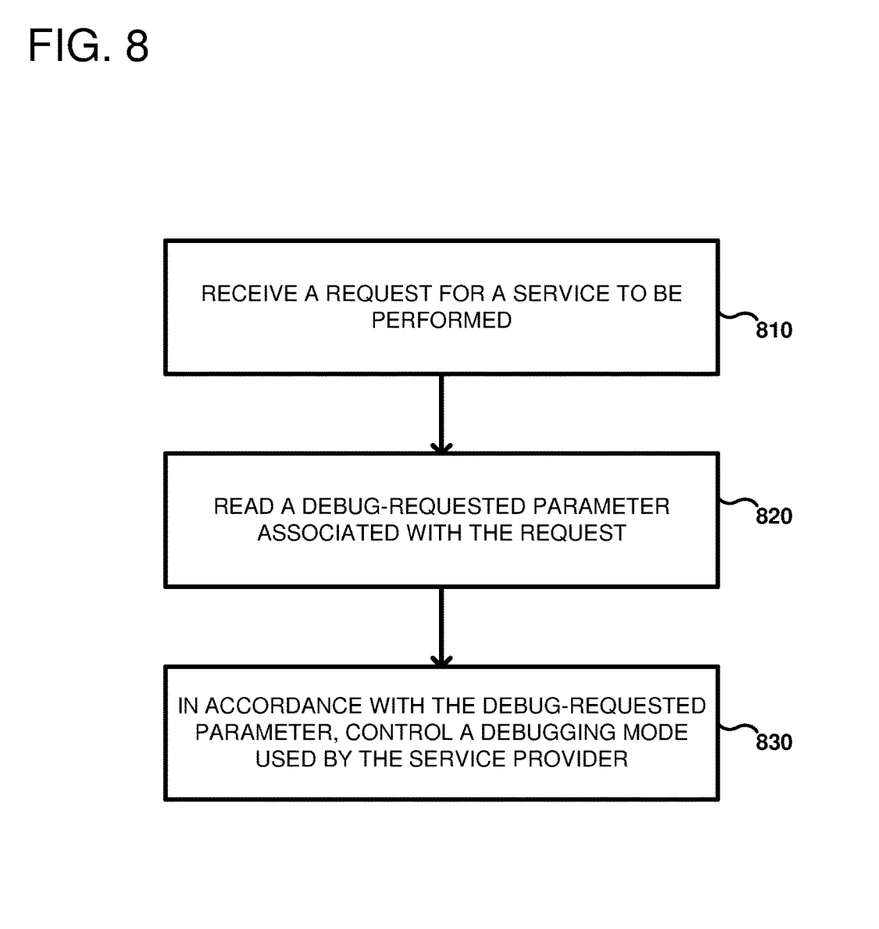
FIG. 8 is a flowchart of a method according to another embodiment used to dynamically control debugging in the multi-tenant environment.

In process block 810, a request for a service to be performed can be received. As previously described, the request can be an API request. Additionally, the request can be from a customer of the service provider or from a service internal to the service provider. In process block 820, a debug-requested parameter associated with the request can be read. The debug-requested parameter can be read from the request itself or from a policy document, wherein the policy document is a document stored by the service provider and associated with a customer of the request. In any event, the debug-requested parameter can be used to control a debugging mode used in processing the request. In addition or alternatively, the request can include an identifier that can be passed between the services. In process block 830, the debugging mode is controlled in accordance with the debug-requested parameter. Controlling the debugging mode can include passing the debugging mode between services of the service provider used to process the request, so as to establish a consistent debug behavior across all services. Additionally, controlling the debugging mode can include logging information associated with the request for each service used to process the request. The information that can be logged can include metadata associated with the request and log data associated with the request. Examples of controlling the debugging mode can include turning the debugging mode off, turning the debugging mode on, or adjusting a level of the debugging mode, wherein the debugging mode includes graduated levels.

It will be recognized that the services of the service provider can have debugging turned off until dynamic requests are made requesting debugging while generating a response to an API. Once the requests are processed, the debugging can be switched back off. In this way, the services can minimize unwanted debugging data, but can switch debugging on to a desired level in response to a request to do so.

Additionally, it will be recognized that the identifier can be used later via internal or external service requests to retrieve all log data associated with the API request. In a particular example, the log data and metadata can be retrieved using the identifier as a key. Various details regarding how the API was processed can be determined from the log data and metadata, such as through a visual display. For example, a graphical presentation can indicate each of the services called in the request, a total amount of memory used, CPU cycles used, network I/O used, disk I/O used, etc. Each of these parameters can be displayed or otherwise saved for later use. Additionally, timing information can be extracted, such as a total time to process the API request or a time for each service to process the request. Other uses of the log data can vary depending on the design.

Figure 9:
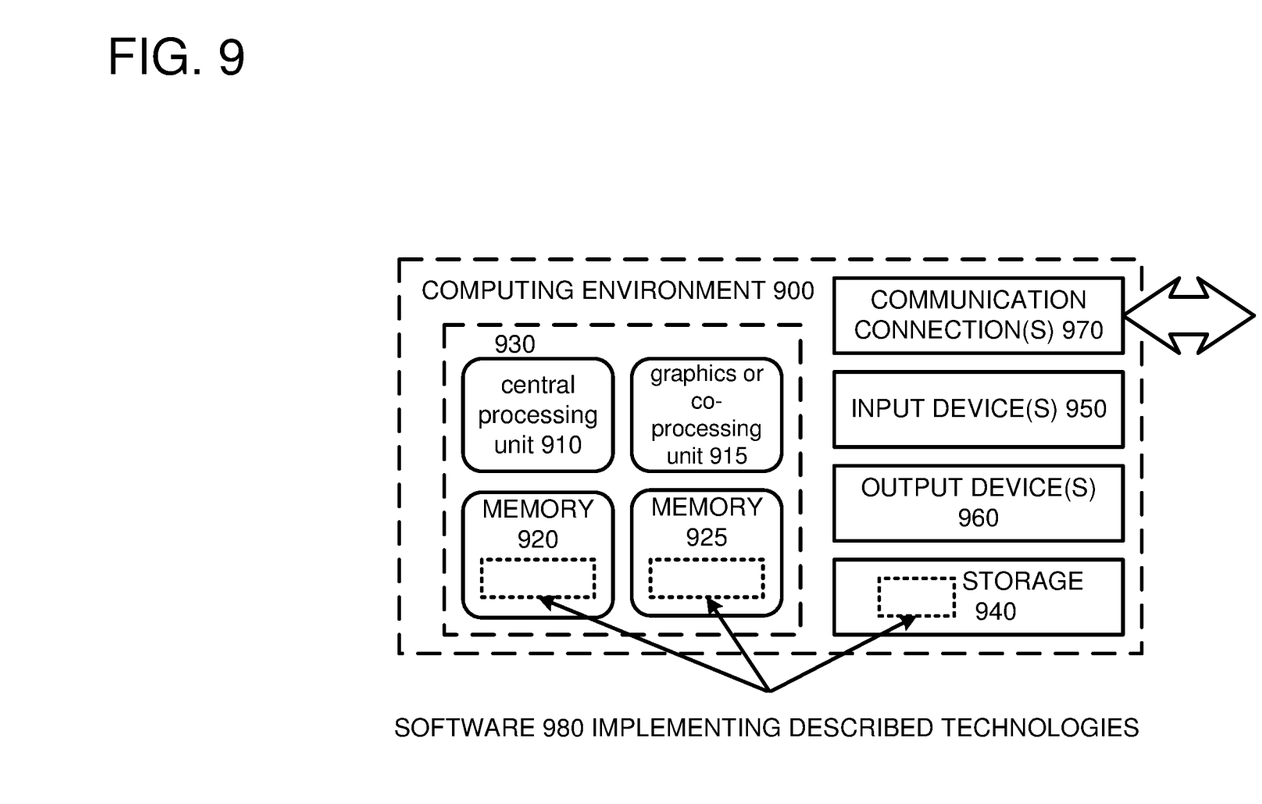
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for controlling debugging in a service provider, the method comprising:
   receiving, at a server computer of the service provider, from a client device, an Application Program Interface (API) request for a service unrelated to debugging to be performed by the service provider;
   in response to the API request, reading a debug-requested parameter included in the API request;
   in accordance with the debug-requested parameter, controlling the debugging mode used by two or more server computers of the service provider while processing the API request, the debugging mode controlling which debug data is stored in association with responding to the API request and wherein two or more server computers provide services associated with responding to the API request and the debugging mode is interpreted differently by the services based on functionality of the services; and
   transmitting a response to the API request to the client device.

2. The method of claim 1, wherein the debug data stored in association with responding to the API request includes storing which API calls are made by the service provider in processing the API request.

3. The method of claim 1, further including transmitting the debugging mode between services of the service provider used to process the request so as to establish a consistent debug behavior across the services.

4. The method of claim 1, wherein the API request is received from a customer of the service provider or from a service within the service provider.

5. The method of claim 1, wherein controlling the debugging mode includes one of the following in two or more services of the service provider, the two or more services executing on different server computers: turning debugging on or adjusting a level of debugging.

6. A computer-readable storage including instructions thereon, which when executed by a processor, perform a method comprising:
   detecting, within a request from a client device to a service provider, a debug-requested parameter controlling a debugging mode to be used while processing the request by the service provider;
   if the debugging-requested parameter is deactivated, performing a service in response to the request without performing debugging; and
   if the debugging-requested parameter is activated, performing the service in response to the request, comprising:
      transmitting the debugging mode to services of the service provider that are needed to process the request so as to establish a debugging behavior across the services, the services being executed on at least one server computer within the service provider;
      logging data by at least some of the services that receive the debugging mode, the logging of the data being in accordance with the debugging mode so as to control which data is stored for debugging purposes;
      the debugging mode being interpreted differently by different services so that the debugging behavior across the services is different.

7. The computer-readable storage of claim 6, wherein the request includes an identifier associated with the debug-requested parameter and the identifier is transmitted to the services of the service provider.

8. The computer-readable storage of claim 7, wherein the logging of the data includes logging metadata associated with the request and logging log data associated with processing the request in a log store using the identifier, and further including retrieving the metadata and log data using the identifier as a key.

9. The computer-readable storage of claim 6, wherein the detecting of the debug-requested parameter includes reading a field within the request itself or reading a field in a document stored by the service provider, the document associated with a customer of the request.

10. The computer-readable storage of claim 6, wherein the debugging mode includes graduated levels of debugging and controlling the debugging mode includes selecting one of the graduated levels based on the request.

11. The computer-readable storage of claim 6, wherein the services that are needed to process the request have debugging switched off prior to receiving the request, and, in response to receiving the debugging mode, dynamically switching on debugging within the services while servicing the request and then switching debugging off once the request is processed.

12. The computer-readable storage of claim 6, wherein other services of the service provider that are not needed to process the request have the debugging mode switched off.

13. The computer-readable storage of claim 6, wherein the logging of the data includes logging one or more of the following parameters associated with the request: CPU cycles needed to service the request, memory used to service the request, disk I/O needed to service the request, or network I/O needed to service the request.

14. A system, comprising:
   a plurality of host server computers for running services in a compute service provider;
   a first of the plurality of host server computers configured to receive a request and to check whether a debug-requested parameter is activated in the request, establishing debug modes on the first of the plurality of host server computers in accordance with the debug-requested parameter, wherein the debug modes behave differently for services based on the functionality of the service, the services being associated with the plurality of host server computers;
   a log database coupled to the first of the plurality of host server computers for storing log data in accordance with the debug-requested parameter; and
   a logging component configured to execute on one of the plurality of host server computers to obtain at least CPU cycles and memory usage associated with responding to the request and to store the CPU cycles and memory usage in the log database.

15. The system of claim 14, wherein the debug-requested parameter includes graduated levels of debugging.

16. The system of claim 14, wherein the debug-requested parameter is interpreted by a service that receives it based on functionality of the service.

17. The system of claim 14, wherein the services that are needed to process the request have debugging switched off prior to receiving the request, and wherein the services that are needed to process the request dynamically switch on debugging while servicing the request and then switch debugging off once the request is processed.

* * * * *